(12) United States Patent
Li

(10) Patent No.: US 10,548,010 B2
(45) Date of Patent: Jan. 28, 2020

(54) VERIFICATION METHOD AND APPARATUS, AND TERMINAL

(71) Applicant: ZTE Corporation, Shenzhen (CN)

(72) Inventor: Qiang Li, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/083,482

(22) PCT Filed: Sep. 19, 2016

(86) PCT No.: PCT/CN2016/099390
§ 371 (c)(1),
(2) Date: Sep. 7, 2018

(87) PCT Pub. No.: WO2017/152618
PCT Pub. Date: Sep. 14, 2017

(65) Prior Publication Data
US 2019/0069172 A1    Feb. 28, 2019

(30) Foreign Application Priority Data
Mar. 9, 2016  (CN) .......................... 2016 1 0132574

(51) Int. Cl.
*H04W 12/06* (2009.01)
*H04W 8/22* (2009.01)
(Continued)

(52) U.S. Cl.
CPC ......... *H04W 12/06* (2013.01); *H04L 63/0876* (2013.01); *H04W 8/22* (2013.01);
(Continued)

(58) Field of Classification Search
CPC ....... H04W 12/06; H04W 76/10; H04W 8/22; H04W 60/00; H04L 63/0876; H04L 69/323
See application file for complete search history.

(56) References Cited

U.S. PATENT DOCUMENTS

2006/0291455 A1* 12/2006 Katz ...................... H04L 29/06
                                                    370/355
2013/0023235 A1    1/2013 Fan
(Continued)

FOREIGN PATENT DOCUMENTS

CN        102917339 A    2/2013
CN        103391535 A    11/2013
(Continued)

OTHER PUBLICATIONS

International Search Report for corresponding application PCT/CN2016/099390 filed on Sep. 19, 2016; dated Dec. 9, 2016.

*Primary Examiner* — Dinh Nguyen
(74) *Attorney, Agent, or Firm* — Cantor Colburn LLP

(57) ABSTRACT

Provided are a verification method and device, and a terminal. The method includes: initiating a request for registration on a wireless network according to initialization information of a virtual subscriber identification module (VSIM) card via a first communication connection, obtaining an authentication pseudo-random code sent by the wireless network, sending the authentication pseudo-random code to a service center of the VSIM card, and obtaining a calculation result sent by the service center and corresponding to the authentication pseudo-random code; and sending the calculation result to the wireless network via the first communication connection, wherein the calculation result is used for performing communication verification on the VSIM card.

20 Claims, 9 Drawing Sheets

(51) Int. Cl.
*H04W 60/00* (2009.01)
*H04W 76/10* (2018.01)
*H04L 29/06* (2006.01)
*H04L 29/08* (2006.01)

(52) U.S. Cl.
CPC .......... *H04W 60/00* (2013.01); *H04W 76/10* (2018.02); *H04L 69/323* (2013.01)

(56) References Cited

U.S. PATENT DOCUMENTS

| | | |
|---|---|---|
| 2014/0245003 A1 | 8/2014 | Barker |
| 2015/0282057 A1* | 10/2015 | Li .................. H04B 7/0871 455/552.1 |
| 2015/0304506 A1 | 10/2015 | Zhu |
| 2016/0234782 A1* | 8/2016 | Su ..................... H04W 52/0229 |
| 2017/0033823 A1* | 2/2017 | Smith ................. H04W 8/18 |
| 2017/0048773 A1* | 2/2017 | Miao .................. H04W 8/183 |

FOREIGN PATENT DOCUMENTS

| | | |
|---|---|---|
| CN | 103686669 A | 3/2014 |
| CN | 105208545 A | 12/2015 |
| CN | 105357660 A | 2/2016 |
| CN | 105516508 A | 4/2016 |
| CN | 105763464 A | 7/2016 |
| EP | 2824945 A1 | 1/2015 |

\* cited by examiner

VERIFICATION METHOD AND APPARATUS, AND TERMINAL

TECHNICAL FIELD

The present disclosure relates to the field of communications, and more particularly, to a verification method and apparatus, and a terminal.

BACKGROUND

In a communication solution for Virtual Subscriber Identity Module (VSIM) cards adopted in related art, communication with a mobile internet and a VSIM card server is implemented by using double chips and double antennae, and the specific acts are as follows:

1) a chip A first performs communication with a target mobile network to which the chip A is to be registered, and obtains an authentication pseudo-random code by using an antenna A;

2) the chip A transfers the obtained authentication pseudo-random code to a chip B, and the chip B uploads this set of authentication pseudo-random code to a VSIM card server via a wireless network using another group of antenna B;

3) the VSIM card server performs calculation on the received authentication pseudo-random code to obtain relevant Subscriber Identity Module (SIM) card information and then sends the relevant SIM card information to the chip B; and 4) the chip B transfers the received VSIM card information to the chip A and the chip A initiates a request for registration on a mobile network using the received virtual SIM card information, thereby completing an entire process of the VSIM card communication at last.

Through the above acts, in order to enable that the communication with the mobile network and the VSIM card server can be simultaneously implemented during an authentication stage, a terminal needs to adopt two chips and two groups of antennas. In this way, although the communication procedures of a VISM card can be implemented, a high cost is caused.

Concerning a problem of how to implement a VSIM technology in a terminal with a single chip and a single antenna terminal in the related art, there is no effective solution yet at present.

SUMMARY

The embodiments of the present disclosure provide a verification method and apparatus, and a terminal, which may solve a problem of how to implement a VSIM technology in a terminal with a single chip and a single antenna in related art.

According to an embodiment of the present disclosure, there is provided a verification method, which may include:

a request for registration on a wireless network is initiated according to initialization information of a VSIM card via a first communication connection, and an authentication pseudo-random code sent by the wireless network is obtained, wherein the first communication connection is a connection established with the wireless network by using a communication protocol stack of the VSIM card;

the authentication pseudo-random code is sent to a service center of the VSIM card via a second communication connection, and a calculation result sent by the service center and corresponding to the authentication pseudo-random code is obtained, wherein the second communication connection is a connection established with the wireless network by using a communication protocol stack of a physical Subscriber Identity Module (SIM) card; and the calculation result is sent to the wireless network via the first communication connection, wherein the calculation result is used for performing communication verification on the VSIM card.

In an exemplary embodiment, before the request for registration on the wireless network is initiated according to the initialization information of the VSIM card, the verification method may include:

the initialization information of the VSIM card is obtained via the second communication connection.

In an exemplary embodiment, after the initialization information of the VSIM card is obtained via the second communication connection, and before the request for registration on the wireless network is initiated according to the initialization information of the VSIM card, the communication protocol stack of the physical SIM card is suspended and the communication protocol stack of the VSIM card is started.

In an exemplary embodiment, after the authentication pseudo-random code sent by the wireless network is obtained, and before the authentication pseudo-random code is sent to the service center of the VSIM card, the communication protocol stack of the VSIM card is suspended, and the communication protocol stack of the physical SIM card is started.

In an exemplary embodiment, after the calculation result sent by the service center and corresponding to the authentication pseudo-random code is obtained, the communication protocol stack of the physical SIM card is suspended and the communication protocol stack of the VSIM card is started.

In an exemplary embodiment, the act that the communication protocol stack of the physical SIM card is suspended may include: a data connection between the physical SIM card and the wireless network is terminated while registration of the communication protocol stack of the physical SIM card on the wireless network is maintained; or a detachment message is sent to the wireless network, wherein the detachment message is used for terminating a communication link between the physical SIM card and the wireless network.

The act that the communication protocol stack of the VSIM card is suspended may include: the authentication pseudo-random code is processed after the communication protocol stack of the VSIM card receives the authentication pseudo-random code sent by the wireless network.

In an exemplary embodiment, under a condition in which the data connection between the physical SIM card and the wireless network is terminated while registration of the communication protocol stack of the physical SIM card on the wireless network is maintained, the act that the communication protocol stack of the physical SIM card is started may include: a data connection is re-initiated to the wireless network by the physical SIM card.

In an exemplary embodiment, under a condition in which the detachment message is sent to the wireless network, wherein the detachment message is used for terminating the communication link between the physical SIM card and the wireless network, the act that the communication protocol stack of the physical SIM card is started may include: an attachment request is sent to the wireless network by using the communication protocol stack of the physical SIM card, wherein the attachment request is used for re-initiating a request for registration of the physical SIM card.

In an exemplary embodiment, under a condition in which the authentication pseudo-random code is processed after the communication protocol stack of the VSIM card receives the authentication pseudo-random code sent by the wireless network, the act that the communication protocol stack of the VSIM card is started may include: after the calculation result sent by the service center and corresponding to the authentication pseudo-random code is obtained, the calculation result is sent to the wireless network by using the communication protocol stack of the VSIM card.

In an exemplary embodiment, after the authentication pseudo-random code is sent to the service center of the VSIM card via the second communication connection, in a case where the calculation result is not obtained within a first predetermined time period, the request for registration on the wireless network is initiated again according to the initialization information via the first communication connection.

In an exemplary embodiment, under a condition in which request information of the request for registration on the wireless network may include negotiation information associated in the first predetermined time period, the request information is sent to the wireless network via the second communication connection, wherein under a condition in which reply information corresponding to the negotiation information is obtained and the reply information indicates to agree with the negotiation information, in a case where the calculation result is not obtained within the first predetermined time period, the request for registration on the wireless network is initiated again according to the initialization information via the first communication connection; and under a condition in which the reply information indicates to disagree with the negotiation information, in a case where the calculation result is not obtained within a second predetermined time period specified by the reply information, the request for registration on the wireless network is initiated again according to the initialization information via the first communication connection.

In an exemplary embodiment, after the calculation result is sent to the wireless network via the first communication connection to perform the communication verification of the VSIM card, under a condition in which the communication verification fails, the request for registration on the wireless network is initiated again according to the initialization information via the first communication connection.

In an exemplary embodiment, after the calculation result is sent to the wireless network via the first communication connection to perform the communication verification of the VSIM card, a statistics is made on the number of times that the communication verification fails; and when the number of times exceeds a preset threshold value, the initialization information of the VSIM card is obtained again via the second communication connection.

According to another embodiment of the present disclosure, there is also provided a verification apparatus, which is located in a terminal and may include:

a first obtaining module, configured to initiate a request for registration on a wireless network according to initialization information of a VSIM card via a first communication connection, and obtain an authentication pseudo-random code sent by the wireless network, wherein the first communication connection is a connection established with the wireless network by using a communication protocol stack of the VSIM card;

an authentication module, configured to send the authentication pseudo-random code to a service center of the VSIM card via a second communication connection, and obtain a calculation result sent by the service center and corresponding to the authentication pseudo-random code, wherein the second communication connection is a connection established with the wireless network by using a communication protocol stack of a physical SIM card; and a sending module, configured to send the calculation result to the wireless network via the first communication connection, wherein the calculation result is used for performing communication verification on the VSIM card.

In an exemplary embodiment, the apparatus may further include:

a second obtaining module, configured to obtain the initialization information of the VSIM card via the second communication connection before the request for registration on the wireless network is initiated according to the initialization information of the VSIM card.

In an exemplary embodiment, the apparatus may further include a switching module.

The switching module is configured to suspend the communication protocol stack of the physical SIM card and start the communication protocol stack of the VSIM card after the initialization information of the VSIM card is obtained via the second communication connection and before the request for registration on the wireless network is initiated according to the initialization information of the VSIM card.

The switching module is further configured to suspend the communication protocol stack of the VSIM card, and start the communication protocol stack of the physical SIM card after the authentication pseudo-random code sent by the wireless network is obtained and before the authentication pseudo-random code is sent to the service center of the VSIM card.

The switching module is further configured to suspend the communication protocol stack of the physical SIM card and start the communication protocol stack of the VSIM card after the calculation result sent by the service center and corresponding to the authentication pseudo-random code is obtained.

In an exemplary embodiment, the apparatus may further include:

a timing module, configured to initiate the request for registration on the wireless network again according to the initialization information via the first communication connection in a case where the calculation result is not obtained within a first predetermined time period after the authentication pseudo-random code is sent to the service center of the VSIM card via the second communication connection.

In an exemplary embodiment, the apparatus may further include:

a negotiation module, configured to send request information to the wireless network via the second communication connection under a condition in which the request information of the request for registration on the wireless network may include negotiation information associated in the first predetermined time period, wherein under a condition in which reply information corresponding to the negotiation information is obtained and the reply information indicates to agree with the negotiation information, in a case where the calculation result is not obtained within the first predetermined time period, the request for registration on the wireless network is initiated again according to the initialization information via the first communication connection; and under a condition in which the reply information indicates to disagree with the negotiation information, in a case where the calculation result is not obtained within a second predetermined time period specified by the reply information, the request for registration on the wireless network is initiated again according to the initialization information via the first communication connection.

In an exemplary embodiment, the apparatus may further include:

a verification module, configured to initiate the request for registration on the wireless network again according to the initialization information via the first communication connection under a condition in which the communication verification fails after the calculation result is sent to the wireless network via the first communication connection to perform the communication verification of the VSIM card.

In an exemplary embodiment, the apparatus may further include:

a statistic module, configured to make a statistics on the number of times that the communication verification fails after the calculation result is sent to the wireless network via the first communication connection to perform the communication verification of the VSIM card, and obtain the initialization information of the VSIM card again via the second communication connection when the number of times exceeds a preset threshold value.

According to still another embodiment of the present disclosure, there is also provided a terminal, which includes the apparatus above.

Some embodiments of the present disclosure also provide a computer storage medium. The computer storage medium may store an execution instruction; and the execution instruction may be used for implementing the verification method in the above embodiments.

Through some embodiments of the present disclosure, a request for registration on a wireless network is initiated according to initialization information of a VSIM card via a first communication connection, and an authentication pseudo-random code sent by the wireless network is obtained, wherein the first communication connection is a connection established with the wireless network by using a communication protocol stack of the VSIM card; the authentication pseudo-random code is sent to a service center of the VSIM card via a second communication connection, and a calculation result sent by the service center and corresponding to the authentication pseudo-random code is obtained, wherein the second communication connection is the connection established with the wireless network by using the communication protocol stack of the physical SIM card; and the calculation result is sent to the wireless network via the first communication connection, wherein the calculation result is used for performing communication verification on the VSIM card. By using this solution, the problem of how to implement a VSIM card technology in a terminal with a single chip and a single antenna is solved, and the use of a VSIM card in a terminal with a single chip and a single antenna is implemented.

BRIEF DESCRIPTION OF THE DRAWINGS

The accompanying drawings are described here to provide deeper understanding of the present disclosure, and form a part of the present disclosure. The schematic embodiments and description of the present disclosure are adopted to explain the present disclosure, and do not form improper limits to the present disclosure. In the drawings.

DETAILED DESCRIPTION OF THE EMBODIMENTS

The present disclosure is described below with reference to the drawings and embodiments in detail. It should be noted that the embodiments of the present application and the characteristics of the embodiments may be combined with each other if there is no conflict.

It is to be noted that, terminologies such as "first" and "second" in the specification, claims and accompanying drawings of the present disclosure are only used to distinguish similar objects, rather than to describe a special order or a precedence order.

Figure 1:
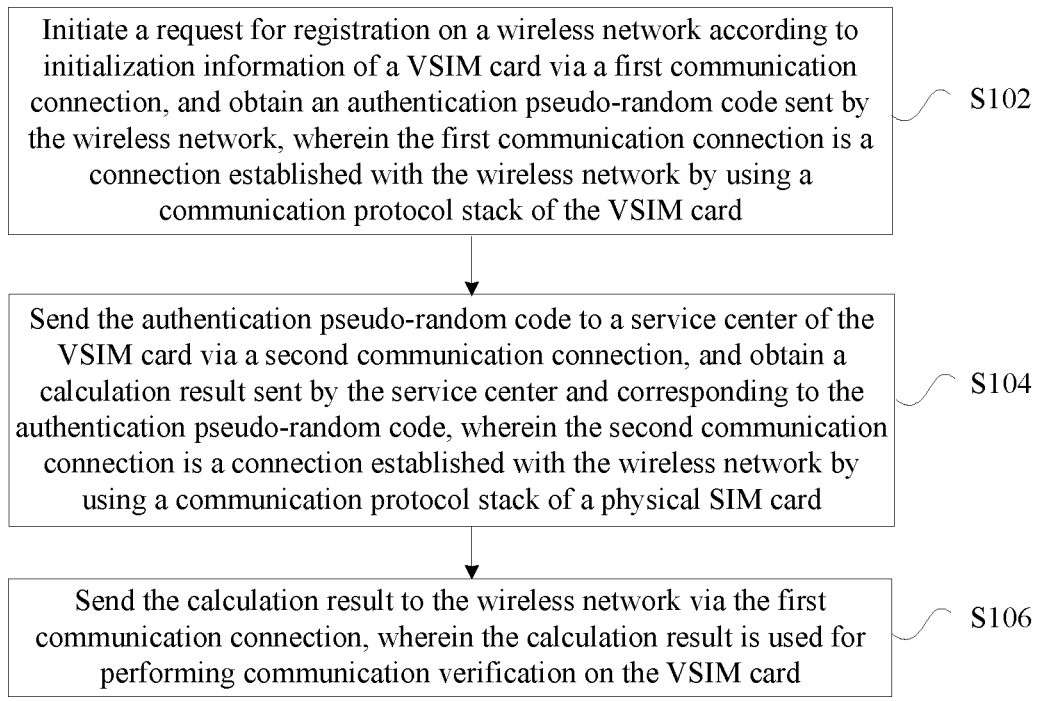
FIG. 1 is a first flowchart of a verification method according to an embodiment of the present disclosure.

In this embodiment, there is provided a verification method. FIG. 1 is a first flowchart of a verification method according to an embodiment of the present disclosure. As shown in FIG. 1, the process may include the following acts S102 to S106.

At act S102, a request for registration on a wireless network is initiated according to initialization information of a VSIM card via a first communication connection, and an authentication pseudo-random code sent by the wireless network is obtained. Herein, the first communication connection is a connection established with the wireless network by using a communication protocol stack of the VSIM card.

At act S104, the authentication pseudo-random code is sent to a service center of the VSIM card via a second communication connection, and a calculation result sent by the service center and corresponding to the authentication pseudo-random code is obtained. Herein, the second communication connection is a connection established with the wireless network by using a communication protocol stack of a physical SIM card.

At act S106, the calculation result is sent to the wireless network via the first communication connection, and the calculation result is used for performing communication verification on the VSIM card.

Through the above acts, the request for registration on the wireless network is initiated according to the initialization information of the VSIM card via the first communication connection, and the authentication pseudo-random code sent by the wireless network is obtained; the authentication pseudo-random code is sent to the service center of the VSIM card via the second communication connection, and the calculation result sent by the service center and corresponding to the authentication pseudo-random code is obtained; and the calculation result is sent to the wireless network via the first communication connection, wherein the calculation result is used for performing communication verification on the VSIM card. By using the solution, the problem of how to implement a VSIM card technology in a terminal with a single chip and a single antenna is solved, and the use of a VSIM card in a terminal with a single chip and a single antenna is implemented.

Figure 2:
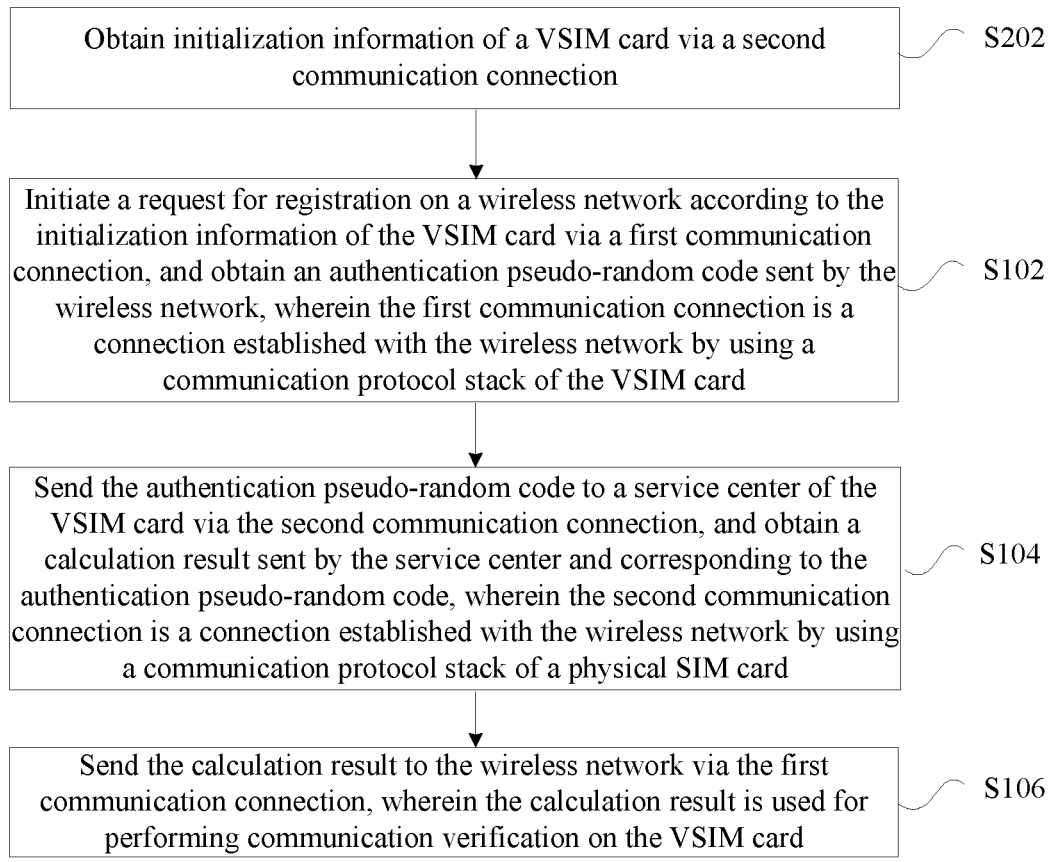
FIG. 2 is a second flowchart of a verification method according to an embodiment of the present disclosure.

In this embodiment, FIG. 2 is a second flowchart of a verification method according to an embodiment of the present disclosure. As shown in FIG. 2, before the request for registration on the wireless network is initiated according to the initialization information of the VSIM card, the process may include the following act S202.

At act S202, the initialization information of the VSIM card is obtained via the second communication connection.

In this embodiment of the present disclosure, after the initialization information of the VSIM card is obtained via the second communication connection, and before the request for registration on the wireless network is initiated according to the initialization information of the VSIM card, the communication protocol stack of the physical SIM card is suspended and the communication protocol stack of the VSIM card is started.

After the authentication pseudo-random code sent by the wireless network is obtained, and before the authentication pseudo-random code is sent to the service center of the VSIM card, the communication protocol stack of the VSIM card is suspended, and the communication protocol stack of the physical SIM card is started.

After the calculation result sent by the service center and corresponding to the authentication pseudo-random code is obtained, the communication protocol stack of the physical SIM card is suspended and the communication protocol stack of the VSIM card is started.

In this embodiment of the present disclosure, the act that the communication protocol stack of the physical SIM card is suspended may include: a data connection between the physical SIM card and the wireless network is terminated while registration of the communication protocol stack of the physical SIM card on the wireless network is maintained; or a detachment message is sent to the wireless network, wherein the detachment message is used for terminating a communication link between the physical SIM card and the wireless network.

The act that the communication protocol stack of the VSIM card is suspended may include: the authentication pseudo-random code is processed after the communication protocol stack of the VSIM card receives the authentication pseudo-random code sent by the wireless network.

In this embodiment of the present disclosure, under a condition in which the data connection between the physical SIM card and the wireless network is terminated while registration of the communication protocol stack of the physical SIM card on the wireless network is maintained, the act that the communication protocol stack of the physical SIM card is started may include: a data connection is re-initiated to the wireless network by the physical SIM card.

In this embodiment of the present disclosure, under a condition in which the detachment message is sent to the wireless network, wherein the detachment message is used for terminating the communication link between the physical SIM card and the wireless network, the act that the communication protocol stack of the physical SIM card is started may include: an attachment request is sent to the wireless network by using the communication protocol stack of the physical SIM card, wherein the attachment request is used for re-initiating a request for registration of the physical SIM card.

In this embodiment of the present disclosure, under a condition in which the authentication pseudo-random code is processed after the communication protocol stack of the VSIM card receives the authentication pseudo-random code sent by the wireless network, the act that the communication protocol stack of the VSIM card is started may include: after the calculation result sent by the service center and corresponding to the authentication pseudo-random code is obtained, the calculation result is sent to the wireless network by using the communication protocol stack of the VSIM card.

In this embodiment of the present disclosure, after the authentication pseudo-random code is sent to the service center of the VSIM card via the second communication connection, in a case where the calculation result is not obtained within a first predetermined time period, the request for registration on the wireless network is initiated again according to the initialization information via the first communication connection.

In this embodiment of the present disclosure, under a condition in which request information of the request for registration on the wireless network includes negotiation information associated in the first predetermined time period, the request information is sent to the wireless network via the second communication connection, wherein under a condition in which reply information corresponding to the negotiation information is obtained and the reply information indicates to agree with the negotiation information, in a case where the calculation result is not obtained within the first predetermined time period, the request for registration on the wireless network is initiated again according to the initialization information via the first communication connection; and under a condition in which the reply information indicates to disagree with the negotiation information, in a case where the calculation result is not obtained within a second predetermined time period specified by the reply information, the request for registration on the wireless network is initiated again according to the initialization information via the first communication connection.

In this embodiment of the present disclosure, after the calculation result is sent to the wireless network via the first communication connection to perform the communication verification of the VSIM card, under a condition in which the communication verification fails, the request for registration on the wireless network is initiated again according to the initialization information via the first communication connection.

In this embodiment of the present disclosure, after the calculation result is sent to the wireless network via the first communication connection to perform the communication verification of the VSIM card, a statistics is made on the number of times that the communication verification fails; and when the number of times exceeds a preset threshold value, the initialization information of the VSIM card is obtained again via the second communication connection.

In an embodiment, there is also provided a verification apparatus. The apparatus is configured to implement the above embodiments and exemplary embodiments, and what have been stated before will not be repeated. As used herein, term "module" may implement a combination of software and/or hardware with a predetermined function. Although the apparatus described by the following embodiment is implemented by software preferably, it is possible and conceivable to implement the apparatus by hardware or a combination of the software and/or the hardware.

Figure 3:
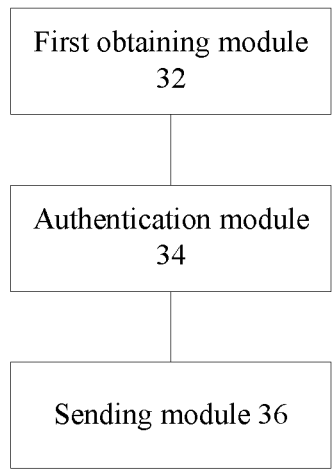
FIG. 3 is a first structure block diagram of a verification apparatus according to an embodiment of the present disclosure.

FIG. 3 is a first structure block diagram of a verification apparatus according to an embodiment of the present disclosure. As shown in FIG. 3, the verification apparatus is located in a terminal and may include a first obtaining module 32, an authentication module 34 and a sending module 36.

The first obtaining module 32 is configured to initiate a request for registration on a wireless network according to initialization information of a VSIM card via a first communication connection, and obtain an authentication pseudo-random code sent by the wireless network, wherein the first communication connection is a connection established with the wireless network by using a communication protocol stack of the VSIM card;

The authentication module 34 is coupled with the first obtaining module 32 and is configured to send the authentication pseudo-random code to a service center of the VSIM card via a second communication connection, and obtain a calculation result sent by the service center and corresponding to the authentication pseudo-random code, wherein the second communication connection is a connection established with the wireless network by using a communication protocol stack of a physical SIM card.

The sending module 36 is coupled with the authentication module 34 and is configured to send the calculation result to the wireless network via the first communication connection, wherein the calculation result is used for performing communication verification on the VSIM card.

Through the above apparatus, the first obtaining module 32 is configured to initiate the request for registration on the wireless network according to the initialization information of the VSIM card via the first communication connection, and obtain the authentication pseudo-random code sent by the wireless network; the authentication module 34 is configured to send the authentication pseudo-random code to the service center of the VSIM card via the second communication connection, and obtain the calculation result sent by the service center and corresponding to the authentication pseudo-random code; and the sending module 36 is configured to send the calculation result to the wireless network via the first communication connection, wherein the calculation result is used for performing communication verification on the VSIM card. By using the solution, the problem of how to implement a VSIM card technology in a terminal with a single chip and a single antenna is solved, and the use of a VSIM card in a terminal with a single chip and a single antenna is implemented.

Figure 4:
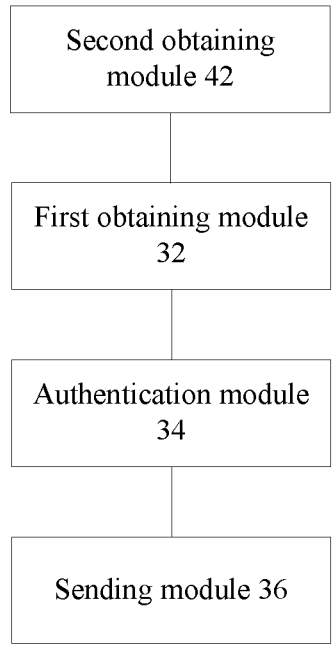
FIG. 4 is a second structure block diagram of a verification apparatus according to an embodiment of the present disclosure.

FIG. 4 is a second structure block diagram of a verification apparatus according to an embodiment of the present disclosure. As shown in FIG. 4, besides the modules included in FIG. 3, the apparatus may further include a second obtaining module 42.

The second obtaining module 42 is coupled with the first obtaining module 32, and is configured to obtain the initialization information of the VSIM card via the second communication connection before the request for registration on the wireless network is initiated according to the initialization information of the VSIM card.

Figure 5:
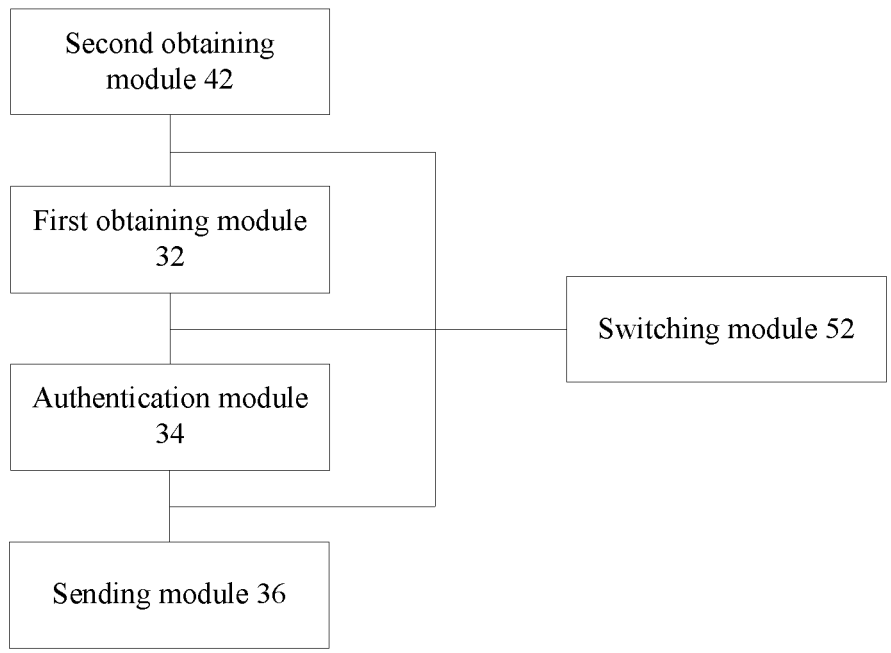
FIG. 5 is a third structure block diagram of a verification apparatus according to an embodiment of the present disclosure.

FIG. 5 is a third structure block diagram of a verification apparatus according to an embodiment of the present disclosure. As shown in FIG. 5, besides the modules included in FIG. 4, the apparatus may further include a switching module 52.

The switching module 52 is configured to suspend the communication protocol stack of the physical SIM card and start the communication protocol stack of the VSIM card after the initialization information of the VSIM card is obtained via the second communication connection and before the request for registration on the wireless network is initiated according to the initialization information of the VSIM card.

The switching module 52 is further configured to suspend the communication protocol stack of the VSIM card, and start the communication protocol stack of the physical SIM card after the authentication pseudo-random code sent by the wireless network is obtained and before the authentication pseudo-random code is sent to the service center of the VSIM card.

The switching module 52 is further configured to suspend the communication protocol stack of the physical SIM card and start the communication protocol stack of the VSIM card after the calculation result sent by the service center and corresponding to the authentication pseudo-random code is obtained.

Figure 6:
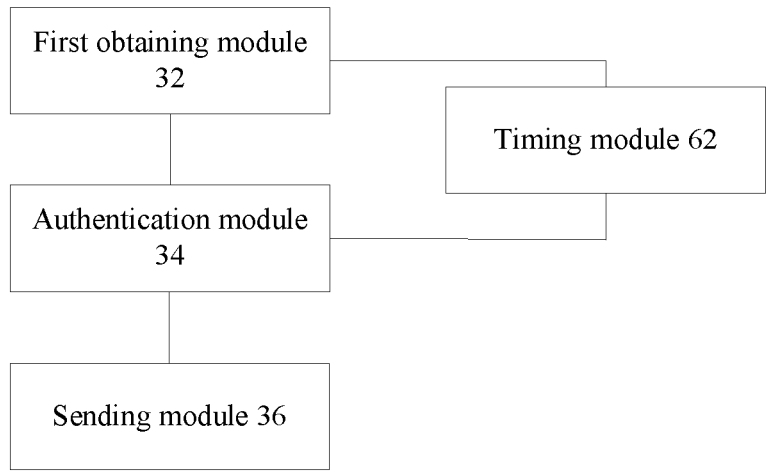
FIG. 6 is a fourth structure block diagram of a verification apparatus according to an embodiment of the present disclosure.

FIG. 6 is a fourth structure block diagram of a verification apparatus according to an embodiment of the present disclosure. As shown in FIG. 6, besides the modules included in FIG. 3, the apparatus may further include a timing module 62.

The timing module 62 is configured to initiate the request for registration on the wireless network again according to the initialization information via the first communication connection in a case where the calculation result is not obtained within a first predetermined time period after the authentication pseudo-random code is sent to the service center of the VSIM card via the second communication connection.

Figure 7:
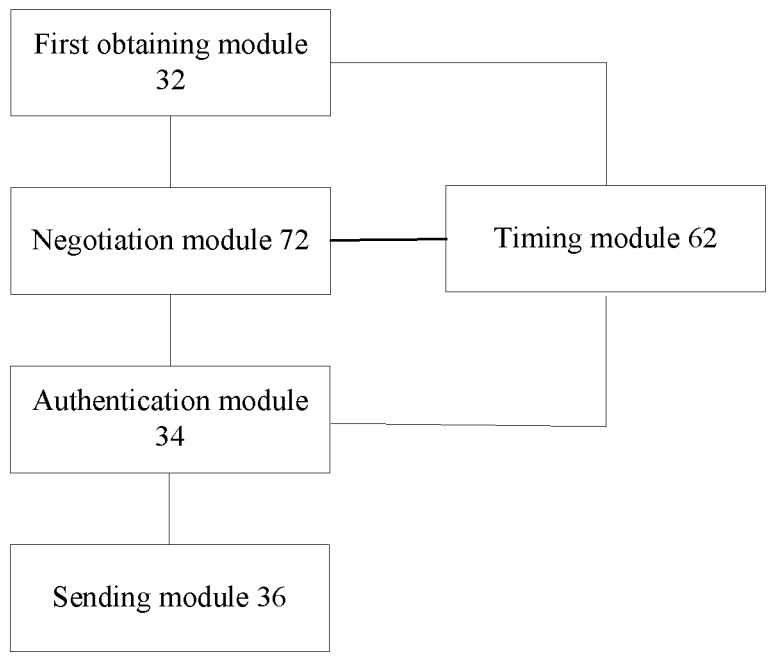
FIG. 7 is a fifth structure block diagram of a verification apparatus according to an embodiment of the present disclosure.

FIG. 7 is a fifth structure block diagram of a verification apparatus according to an embodiment of the present disclosure. As shown in FIG. 7, besides the modules included in FIG. 6, the apparatus may further include a negotiation module 72.

The negotiation module 72 is configured to send request information to the wireless network via the second communication connection under a condition in which the request information of the request for registration on the wireless network may include negotiation information associated in the first predetermined time period, wherein under a condition in which reply information corresponding to the negotiation information is obtained and the reply information indicates to agree with the negotiation information, in a case where the calculation result is not obtained within the first predetermined time period, the request for registration on the wireless network is initiated again according to the initialization information via the first communication connection; and under a condition in which the reply information indicates to disagree with the negotiation information, in a case where the calculation result is not obtained within a second predetermined time period specified by the reply information, the request for registration on the wireless network is initiated again according to the initialization information via the first communication connection.

Figure 8:
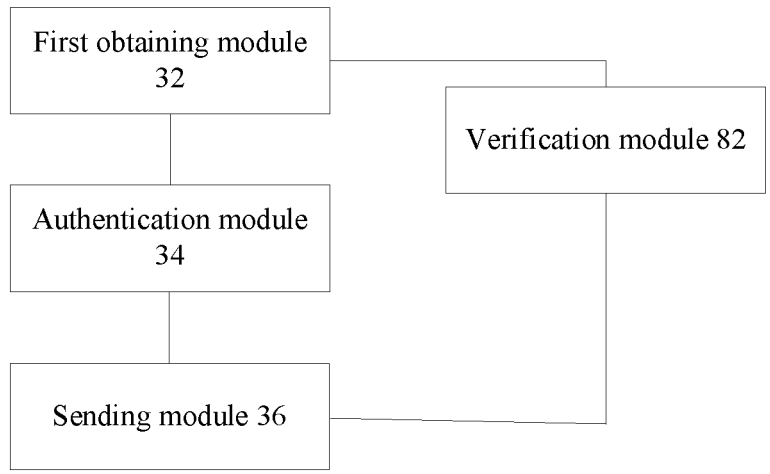
FIG. 8 is a sixth structure block diagram of a verification apparatus according to an embodiment of the present disclosure.

FIG. 8 is a sixth structure block diagram of a verification apparatus according to an embodiment of the present disclosure. As shown in FIG. 8, besides the modules included in FIG. 3, the apparatus may further include a verification module 82.

The verification module 82 is configured to initiate the request for registration on the wireless network again according to the initialization information via the first communication connection under a condition in which the communication verification fails after the calculation result is sent to the wireless network via the first communication connection to perform the communication verification of the VSIM card.

Figure 9:
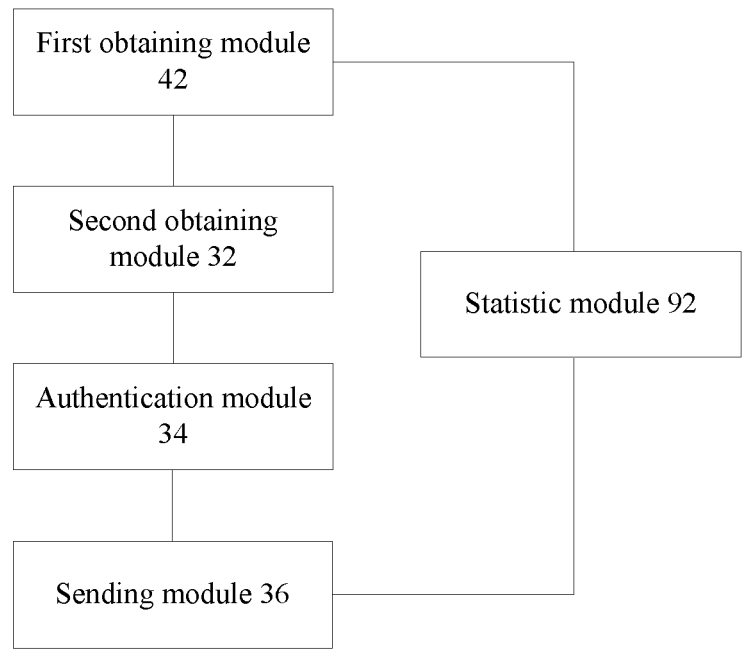
FIG. 9 is a seventh structure block diagram of a verification apparatus according to an embodiment of the present disclosure.

FIG. 9 is a seventh structure block diagram of a verification apparatus according to an embodiment of the present disclosure. As shown in FIG. 9, besides the modules included in FIG. 4, the apparatus may further include a statistic module 92.

The statistic module 92 is configured to make a statistics on the number of times that the communication verification fails after the calculation result is sent to the wireless network via the first communication connection to perform the communication verification of the VSIM card, and obtain the initialization information of the VSIM card again via the second communication connection when the number of times exceeds a preset threshold value.

According to still another embodiment of the present disclosure, there is also provided a terminal, which includes the apparatus above. Through the above apparatus, the terminal may implement the use of a VSIM card only by using a single chip and a single antenna.

The present disclosure will be described below in detail with reference to exemplary embodiments and exemplary implementation manners.

The exemplary embodiment of the present disclosure proposes a solution for implementing VSIM card authentication via a time division multiplexing method on a terminal with a single chip and a single antenna, so as to reduce the implementation cost of the VSIM card solution.

The terminal may include a prefabricated physical SIM card module, a communication protocol stack of the physical SIM card, a VSIM card unit, a communication protocol stack of the VSIM card, a communication protocol stack switching control unit (configured to perform time division multiplexing control on both the communication protocol stack of the physical SIM card and the communication protocol stack of the VSIM card and equivalent to the switching module 52 in the above embodiment, in which the switching unit controls which protocol stack to work, that protocol stack will be responsible for communication with a wireless network) and a an authentication result waiting timer ($T_{auth}$) (equivalent to the timing module 62 in the above embodiment).

Through the above terminal, the technical solution of the exemplary embodiment of the present disclosure may include the following stages.

At a first stage: a terminal registers on a wireless network by using a communication protocol stack of the physical SIM card using a prefabricated physical SIM card module, establishes a data connection and connects to an Internet network. VSIM card information is downloaded from a service center of the VSIM card in the Internet network and the terminal stores the information to a VSIM card unit. The information mainly includes initialization information used when a VSIM card registers on the wireless network, such as an International Mobile Subscriber Identity (IMSI), an Ad and an Integrated Circuit Card Identity (ICCID).

At a second stage: after the terminal receives all initialization information used when the VSIM card registers on the wireless network, a communication protocol stack switching control unit suspends a communication protocol stack of the physical SIM card (the communication protocol stack of the physical SIM card may keep a registered state with the wireless network, and may also not keep the registered state but enter a deregistered state), simultaneously starts a communication protocol stack of the VSIM card and initiates registration on the wireless network using downloaded VSIM card information. After the request for registration is initiated, the wireless network sends a set of authentication pseudo-random code.

At a third stage: after the terminal receives the authentication pseudo-random code, the communication protocol stack switching control unit suspends the communication protocol stack of the VSIM card, starts a communication protocol stack of the physical SIM card, restores the data connection between the communication protocol stack of the physical SIM card and the wireless network, sends the authentication pseudo-random code to a service center of the VSIM card on an Internet, and waits for the service center of the VSIM card to feed back a calculation result. At this moment, the communication protocol stack of the VSIM card in the terminal does not stop the work and keep a current communication state. In the meanwhile, the authentication result waiting timer $T_{auth}$ is started. After the $T_{auth}$ expires, in a case where the terminal still does not receive the calculation result from the service center of the VSIM card, the communication protocol stack switching control unit switches to the communication protocol stack of the VSIM card and initiates the request for registration on the wireless network again using the VSIM card information, that is, the second stage and the third stage are repeated.

At a fourth stage: after the terminal receives the authentication calculation result sent back by the service center of the VSIM card, the communication protocol stack switching control unit suspends the communication protocol stack of the physical SIM card of the terminal, switches to the communication protocol stack of the VSIM card and sends the calculation result to a wireless network on which the terminal is to be registered, thereby implementing the entire authentication process of the VSIM card. If the network feeds back that the authentication is refused, it is suggested to return to the second stage to restart the processing.

Exception Handling

1. At the fourth stage, since the network feeds back that the authentication is refused, it is suggested to return to the second stage to restart the processing. However, a threshold value n (n≥2) is suggested to be set. If this process is circulated for n times and the network still returns that the authentication is refused, the VSIM card information is suggested to be updated, that is, it is suggested to return to the first stage.

2. In all stages, once the terminal detects that the authentication of the VSIM card information fails, the entire process is started again by going back to the first stage.

Through the above terminal, the exemplary embodiment implements a function of applying the VSIM card on a terminal with a single chip and a single antenna, and the implementation cost is reduced.

Figure 10:
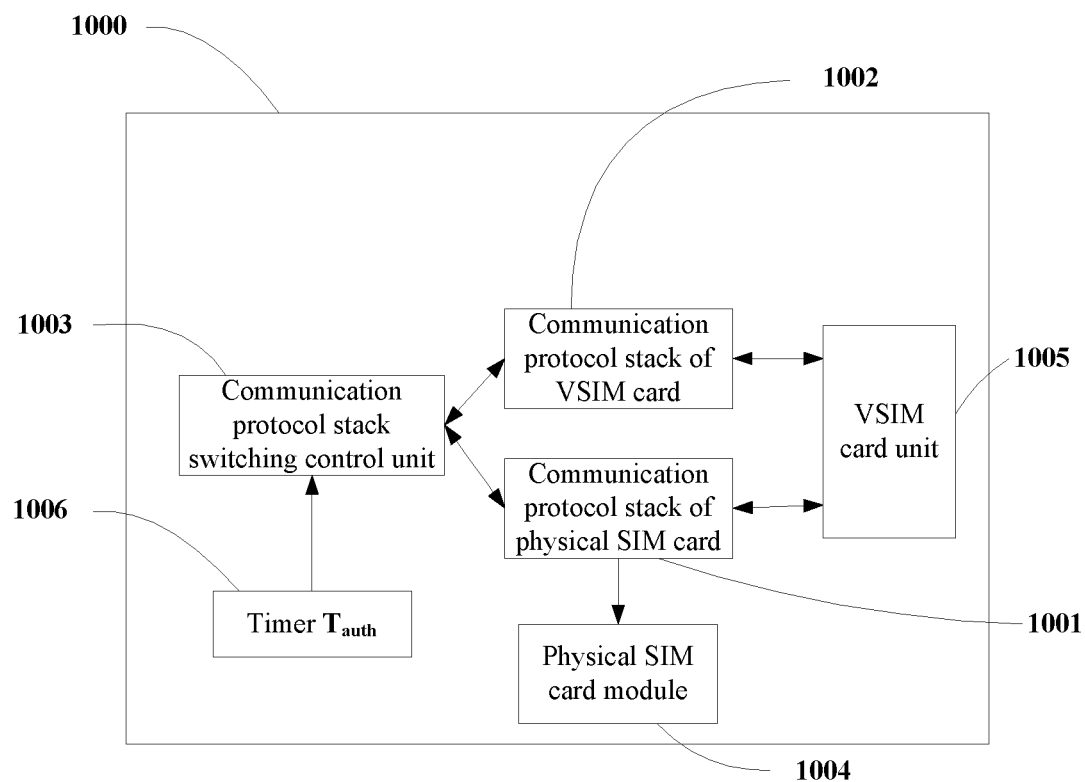
FIG. 10 is a schematic diagram of a terminal apparatus for implementing a function of a VSIM card according to an exemplary embodiment of the present disclosure.

FIG. 10 is a schematic diagram of a terminal apparatus for implementing a function of a VSIM card according to an exemplary embodiment of the present disclosure. As shown in FIG. 10, a terminal 1000 may include: a communication protocol stack 1001 of the physical SIM card, a communication protocol stack 1002 of the VSIM card, a communication protocol stack switching control unit 1003 (a default state during startup of the terminal 1000 is that the communication protocol stack 1001 of the physical SIM card is started and the communication protocol stack 1002 of the VSIM card is closed), a physical SIM card module 1004, a VSIM card unit 1005 and a timer $T_{auth}$ 1006. The time set for the timer $T_{auth}$ is equal to a time interval for retransmission of the authentication pseudo-random code sent by the wireless network in two times*(the number of authentication pseudo-random code retransmission times−1).

First, the communication protocol stack 1001 of the physical SIM card establishes a data service connection with the wireless network using a prefabricated physical SIM card in the physical SIM card module 1004, and downloads initialization information of the VSIM card (including some associated initialization information such as the IMSI, the AD and the ICCID) required by a registration process of the VSIM card from a service center of the VSIM card. The terminal 1000 stores the information to the VSIM card unit 1005. And after all required initialization information is received completely, the communication protocol stack 1001 of the physical SIM card transfers a message to the communication protocol stack switching control unit 1003 and prompts that the initialization information of the VSIM card has been received completely.

Then, after the reception of the message prompting that the initialization information of the VSIM card is received completely, the communication protocol stack switching control unit 1003 suspends the communication protocol stack 1001 of the physical SIM card and switches to the communication protocol stack 1002 of the VSIM card. At this moment, the communication protocol stack 1001 of the physical SIM card may keep a registered state with the wireless network, and may alternatively switch to a deregistered state. After the communication protocol stack 1002 of the VSIM card is started, a request for registration is initiated to a required wireless network using the initialization information in the VSIM card unit 1005. After the request for registration is initiated, the wireless network sends a set of authentication pseudo-random code to the terminal 1000 and stores the set of authentication pseudo-random code in the VSIM card unit 1005. After the reception of the authentication pseudo-random code, the communication protocol stack 1002 of the VSIM card transfers a message to the communication protocol stack switching control unit 1003 and prompts that the authentication pseudo-random code has been received.

Next, after the reception of the message about the authentication pseudo-random code, the communication protocol stack switching control unit 1003 quickly switches to the communication protocol stack 1001 of the physical SIM card and simultaneously starts the timer $T_{auth}$. At this moment, the communication protocol stack 1002 of the VSIM card still keeps a current communication state. The communication protocol stack 1001 of the physical SIM card restores a data service with the wireless network (in a case where the registered state is kept previously, only the data service is to be restored at this moment; and in a case where the registered state is not kept, procedures such as registration on the wireless network and establishment of the data service are to be executed again), reads authentication pseudo-random code information from the VSIM card unit 1005, sends the authentication pseudo-random code information to the service center of the VSIM card, and waits for the service center of the VSIM card to feed back a calculation result. The service center of the VSIM card sends the authentication calculation result back to the terminal 1000 via a data service channel established by the physical SIM card and stores the authentication calculation result in the VSIM card unit 1005. Then, the communication protocol stack 1001 of the physical SIM card transfers a message to the communication protocol stack switching control unit 1003 and prompts that the authentication calculation result has been received.

At last, after the reception of the message prompting reception of the authentication calculation result, the communication protocol stack switching control unit 1003 quickly switches to the communication protocol stack 1002 of the VSIM card. The 1002 reads the calculation result from the VSIM card unit 1005 and sends the calculation result to the wireless network kept in the communication state previously, thereby implementing the entire authentication process.

In order to improve the stability and the robustness of the system, the following exceptions are suggested to be handled correspondingly.

1. If the $T_{auth}$ expires, the communication protocol stack switching control unit 1003 switches to the communication protocol stack 1002 of the VSIM card and initiates the request for registration on the wireless network again regardless of which protocol stack works at present. The advantage in handling this exception lies in: the value of the timer $T_{auth}$ is consistent with an authentication overall time specified by a network side, so the terminal 1000 initiates the request for registration again without necessarily waiting for the network to feed back an authentication expiration message and the handling process for the expiration is simplified.

2. If the network feeds back that the authentication is refused, it represents that the calculation result of the service center of the VSIM card is wrong and the communication protocol stack 1002 of the VSIM card needs to initiate the request for registration on the network again.

3. If the network feeds back that the authentication expires, the communication protocol stack 1002 of the VSIM card needs to initiate the request for registration on the network again.

4. A threshold value n (n≥2) is set in the communication protocol stack 1002 of the VSIM card. If the network feeds back that the authentication is refused or expires for the $n^{th}$ time, it represents that the VSIM card information is wrong, the VSIM card information needs to be updated and the communication protocol stack switching control unit 1003 switches to the communication protocol stack 1001 of the physical SIM card, which then connects to the service center of the VSIM card and updates the VSIM card information.

Figure 11:
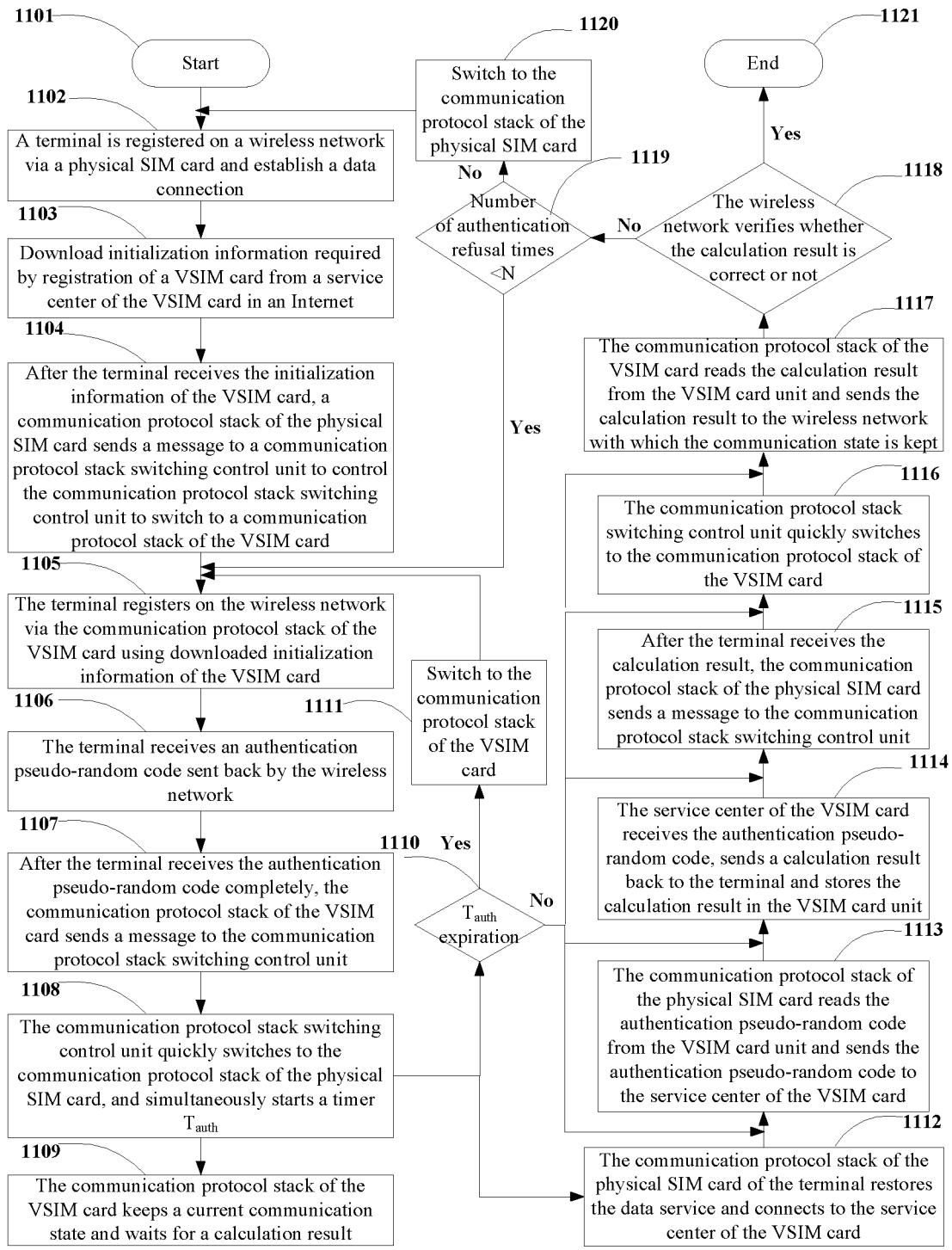
FIG. 11 is a first flowchart for implementing an authentication function of a VSIM card according to an exemplary embodiment of the present disclosure.

FIG. 11 is a first flowchart for implementing an authentication function of a VSIM card according to an exemplary embodiment of the present disclosure. As shown in FIG. 11, the process may include the following acts 1101 to 1121.

At act 1101, a VSIM card authentication process is started.

At act 1102, a terminal 1000 registers on a wireless network via a physical SIM card and establishes a data connection. This process is implemented by the communication protocol stack 1001 of the physical SIM card in FIG. 10 using the physical SIM card in the physical SIM card module 1004.

At act 1103, after establishing the data connection with the wireless network, the terminal 1000 downloads initialization information required by registration of a VSIM card from a service center of the VSIM card in an Internet and then stores the initialization information to a VSIM card unit 1005. In this process, the communication protocol stack 1001 of the physical SIM card in FIG. 10 is responsible for downloading the initialization information required by the registration of the VSIM card and storing the initialization information to the VSIM card unit 1005.

At act 1104, after the terminal 1000 receives the initialization information of the VSIM card, a communication protocol stack 1001 of the physical SIM card sends a message to a communication protocol stack switching control unit 1003, and then the communication protocol stack switching control unit 1003 closes (suspends) the communication protocol stack 1001 of the physical SIM card and starts a communication protocol stack 1002 of the VSIM card. In this process, after the reception of the initialization information of the VSIM card, the communication protocol stack 1001 of the physical SIM card in the FIG. 10 sends a message to the communication protocol stack switching control unit 1003 and the communication protocol stack switching control unit 1003 controls to switch to the communication protocol stack 1002 of the VSIM card.

At act 1105, the terminal 1000 initiates a request for registration on a corresponding wireless network using downloaded initialization information of the VSIM card. In this process, the communication protocol stack 1002 of the VSIM card in FIG. 10 completes the request for registration using information in the VSIM card unit 1005.

At act 1106, the wireless network sends an authentication pseudo-random code according to the request for registration of the terminal 1000. After the reception of the authentication pseudo-random code, the terminal 1000 stores the authentication pseudo-random code to the VSIM card unit 1005. In this process, the communication protocol stack 1002 of the VSIM card in FIG. 10 is responsible for receiving the authentication pseudo-random code and then storing the authentication pseudo-random code to the VSIM card unit 1005.

At act 1107, after the terminal 1000 receives the authentication pseudo-random code completely, the communication protocol stack 1002 of the VSIM card sends a message to the communication protocol stack switching control unit 1003. In this process, the communication protocol stack 1002 of the VSIM card in FIG. 10 is responsible for sending the message to the communication protocol stack switching control unit 1003.

At act 1108, after the reception of the message, the communication protocol stack switching control unit 1003 quickly switches from the communication protocol stack 1002 of the VSIM card to the communication protocol stack 1001 of the physical SIM card, and simultaneously starts a timer $T_{auth}$. In this process, the communication protocol stack switching control unit 1003 in FIG. 10 implements the switching and the timer $T_{auth}$ 1006 is started. The timer is valued as follows: $T_{auth}$=time interval for retransmitting the authentication pseudo-random code sent by the wireless network in two times*(the number of authentication pseudo-random code retransmission times−1).

At act 1109, when the act 1108 is executed, the communication protocol stack switching control unit 1003 suspends the communication protocol stack 1002 of the VSIM card and switches to the communication protocol stack 1001 of the physical SIM card, but the communication protocol stack 1002 of the VSIM card still keeps a current state and waits for a calculation result of the authentication pseudo-random code.

At act 1110, the timer $T_{auth}$ starts to monitor subsequent acts and procedures involved by the terminal 1000. If the timer does not expire, the subsequent procedures are executed in sequence. Once the timer expires], regardless of which protocol stack works at present, the communication protocol stack switching control unit 1003 switches to the communication protocol stack 1002 of the VSIM card and then return to the act 1105. In this process, the timer $T_{auth}$ 1006 in FIG. 10 is responsible for implementing time control and the communication protocol stack switching control unit 1003 is responsible for implementing a switching process.

At act 1111, in a case where the timer $T_{auth}$ expires, the communication protocol stack switching control unit 1003 switches to the communication protocol stack 1002 of the VSIM card regardless of which protocol stack works at present and then returns to the act 1105. In this process, the timer $T_{auth}$ 1006 in FIG. 10 is responsible for implementing time control and the communication protocol stack switching control unit 1003 is responsible for implementing a switching process of switching to the communication protocol stack 1002 of the VSIM card.

At act 1112, within a time of the timer $T_{auth}$, after the communication protocol stack switching control unit 1003 switches to the communication protocol stack 1001 of the physical SIM card, the communication protocol stack 1001 of the physical SIM card restores the data service with the wireless network and establishes a connection with the service center of the VSIM card. This process is implemented by the communication protocol stack 1001 of the physical SIM card in FIG. 10.

At act 1113, within a time of the timer $T_{auth}$, after establishing the connection with the service center of the VSIM card, the communication protocol stack 1001 of the physical SIM card reads the authentication pseudo-random code from the VSIM card unit 1005 and sends the authentication pseudo-random code to the service center of the VSIM card. In this process, the communication protocol stack 1001 of the physical SIM card in FIG. 10 is responsible for reading the authentication pseudo-random code from the VSIM card unit 1005 and then sending the authentication pseudo-random code to the service center of the VSIM card.

At act 1114, within a time of the timer $T_{auth}$, the terminal 1000 receives a calculation result of the authentication pseudo-random code from the service center of the VSIM card and stores the calculation result in the VSIM card unit 1005. In this process, the VSIM card unit 1005 in FIG. 10 is responsible for storing.

At act 1115, within a time of the timer $T_{auth}$, after the terminal 1000 receives the calculation result, the communication protocol stack 1001 of the physical SIM card sends a message to the communication protocol stack switching control unit 1003 and prompts that the calculation result has been received. In this process, the communication protocol stack 1001 of the physical SIM card in FIG. 10 is responsible for sending the message to the communication protocol stack switching control unit 1003.

At act 1116, within a time of the timer $T_{auth}$, after the reception of the message prompting that the calculation result has been received, the communication protocol stack switching control unit 1003 switches to the communication protocol stack 1002 of the VSIM card. This process is implemented by the communication protocol stack switching control unit 1003 in FIG. 10 which switches to the communication protocol stack 1002 of the VSIM card.

At act 1117, within a time of the timer $T_{auth}$, the communication protocol stack 1002 of the VSIM card reads the calculation result from the VSIM card unit 1005 and sends the calculation result to the wireless network with which the communication state is kept. In this process, the communication protocol stack 1002 of the VSIM card in FIG. 10 reads the information from the VSIM card unit 1005.

At act 1118, the network judges whether the authentication calculation result sent by the terminal 1000 is correct or not.

At act 1119, in a case where the calculation result is incorrect or the network feeds back that the authentication expires, the terminal 1000 receives authentication refusal information or expiration information sent back by the network, and the terminal 1000 judges whether the number of times of receiving this type of information is less than n (the value of n is determined according to an actual condition, n≥2) or not first, and then returns to the act 1105 in a case where the time is less than n. This process is implemented by the communication protocol stack 1002 of the VSIM card in FIG. 10.

At act 1120, in a case where the number of times of reception of the authentication refusal information is greater than or equal to n, the communication protocol stack switching control unit 1003 switches to the communication protocol stack 1001 of the physical SIM card and returns to the act 1102. In this process, the communication protocol stack 1002 of the VSIM card in FIG. 10 sends a message to the communication protocol stack switching control unit 1003.

At act 1121, in a case where the wireless network judges that the authentication calculation result is correct, the entire VSIM card authentication process is completed and the process ends.

In another embodiment of the present disclosure, the value of the timer $T_{auth}$ is determined by negotiation between the terminal 1000 and the network.

Figure 12:
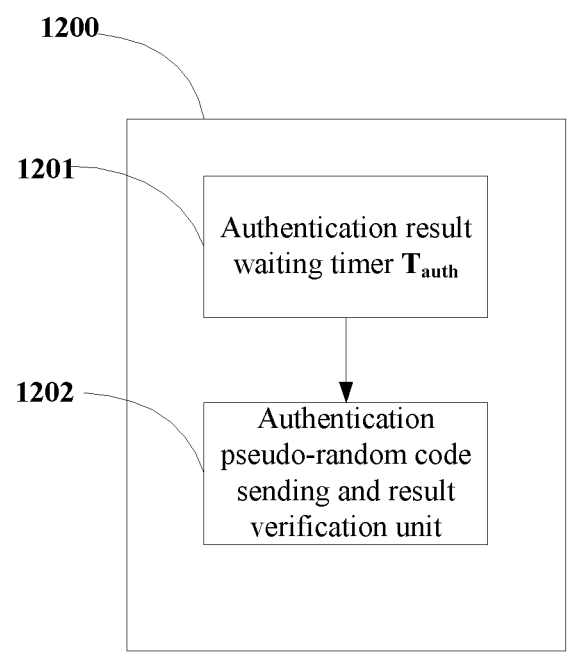
FIG. 12 is a system diagram of a function of a network portion for implementing a function of a VSIM card according to an exemplary embodiment of the present disclosure.

FIG. 12 is a system diagram of a function of a network portion for implementing a function of a VSIM card according to an exemplary embodiment of the present disclosure. As shown in FIG. 12, the system 1200 may include an authentication result waiting timer 1201 and an authentication pseudo-random code generation and result verification unit 1202.

First, when a terminal apparatus 1000 shown in FIG. 10 initiates a request for registration to a wireless network 1200 system via a communication protocol stack 1002 of the VSIM card, negotiation information of a timer $T_{auth}$ is carried in the request for registration.

Then, after the reception of the request for registration of the terminal 1000 and a message of the timer $T_{auth}$, the wireless network 1200 conducts a judgment based on a value of the $T_{auth}$. If the communication protocol stack 1001 of the physical SIM card in the wireless network 1200 judges that the value, sent by the terminal 1000, of the $T_{auth}$ is within an acceptable range, a message of accepting the $T_{auth}$ is sent and the message is placed into an authentication request message and sent to the terminal 1000 together with the authentication pseudo-random code. If the authentication result waiting timer 1201 in the wireless network 1200 judges that the value, sent by the terminal 1000, of the $T_{auth}$ is not within the acceptable range, the authentication result waiting timer 1201 in the 1200 sends an authentication waiting time to the terminal 1000 and stores the authentication waiting time to the timer $T_{auth}$ 1006 of the terminal 1000, and authentication waiting time information is also placed in the authentication request message and is sent to the terminal 1000 together with the authentication pseudo-random code.

At last, within a specified time of the timer 1201, after the authentication pseudo-random code generation and result verification unit 1202 receives the authentication calculation result sent back by the terminal 1000 and verifies that the calculation result is correct, the entire authentication process is completed. If the timer expires, an expiration message is sent to the terminal 1000, so that the terminal 1000 initiates the request for registration again.

Figure 13:
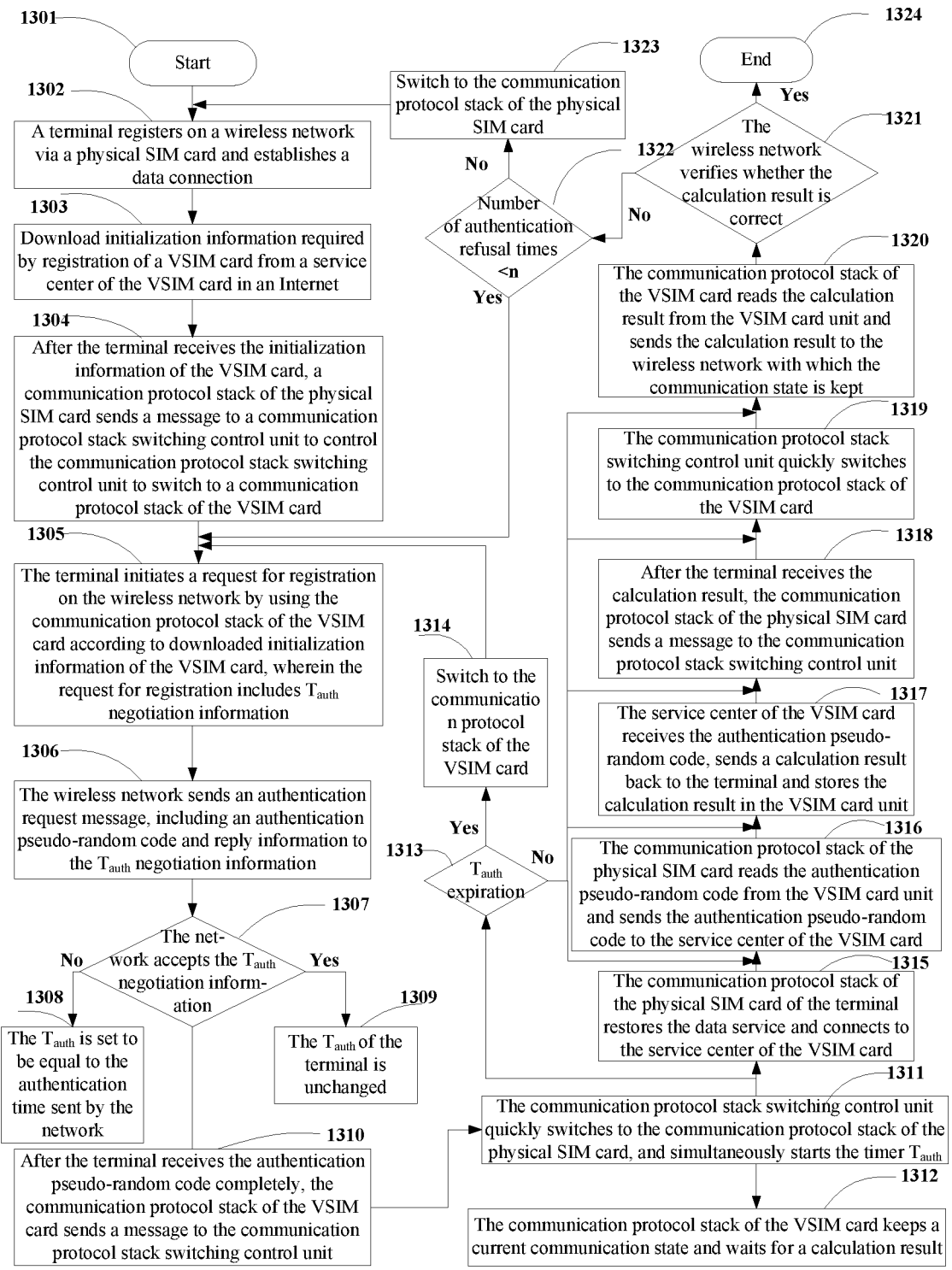
FIG. 13 is a second flowchart for implementing an authentication function of a VSIM card according to an exemplary embodiment of the present disclosure.

FIG. 13 is a second flowchart for implementing an authentication function of a VSIM card according to an exemplary embodiment of the present disclosure. As shown in FIG. 13, the process may include the following acts.

At act 1301, a VSIM card authentication process is started.

At act 1302, a terminal 1000 registers on a wireless network via a physical SIM card and establishes a data connection. This process is implemented by the communication protocol stack 1001 of the physical SIM card in FIG. 10 using a physical SIM card in the physical SIM card module 1004.

At act 1303, after establishing the data connection with the wireless network, the terminal 1000 downloads initialization information required by registration of a VSIM card from a service center of the VSIM card in an Internet and then stores the initialization information to a VSIM card unit 1005. In this process, the communication protocol stack 1001 of the physical SIM card in FIG. 10 is responsible for downloading the initialization information required by the registration of the VSIM card and storing the initialization information to the VSIM card unit 1005.

At act 1304, after the terminal 1000 receives the initialization information of the VSIM card, a communication protocol stack 1001 of the physical SIM card sends a message to a communication protocol stack switching control unit 1003, and then the communication protocol stack switching control unit 1003 closes (suspends) the communication protocol stack 1001 of the physical SIM card and starts a communication protocol stack 1002 of the VSIM card. In this process, after the reception of the initialization information of the VSIM card, the communication protocol stack 1001 of the physical SIM card in the FIG. 10 sends a message to the communication protocol stack switching control unit 1003 and the communication protocol stack switching control unit 1003 controls to switch to the communication protocol stack 1002 of the VSIM card.

At act 1305, the terminal 1000 initiates a request for registration on a corresponding wireless network using downloaded initialization information of the VSIM card, in which the request message may include timer $T_{auth}$ negotiation information. In this process, the communication protocol stack 1002 of the VSIM card in FIG. 10 completes the request for registration using information in the VSIM card unit 1005, and $T_{auth}$=time interval for retransmitting the authentication pseudo-random code sent by the wireless network in two times*(the number of authentication pseudo-random code retransmission times−1).

At act 1306, the wireless network sends authentication request information according to the request message for registration of the terminal 1000, including an authentication pseudo-random code and a reply to the $T_{auth}$ negotiation information. In this process, the authentication pseudo-random code generation and result verification unit 1202 in FIG. 12 is responsible for sending the authentication pseudo-random code, and the terminal 1000 receives the authentication pseudo-random code and then stores the authentication pseudo-random code to the VSIM card unit 1005. Meanwhile, the authentication result waiting timer 1201 in FIG. 12 judges whether the $T_{auth}$ negotiation information in the request message for registration is acceptable and replies with a result. If the network accepts the $T_{auth}$ negotiation information, a field which indicates "agreed" is replied; and in a case where the network does not accept the $T_{auth}$ negotiation information, a field which indicates "not agreed" is replied and a $T'_{auth}$ time value is sent.

At act 1307, the timer $T_{auth}$ in the terminal 1000 checks a judgement of the network on the $T_{auth}$ negotiation information. This process is implemented by the timer $T_{auth}$ 1006 in FIG. 10.

At act 1308, in a case where the network does not accept the $T_{auth}$ negotiation information of the terminal 1000, the $T'_{auth}$ value in the message replied by the network is set to the timer $T_{auth}$ of the terminal 1000. This process is implemented by the timer $T_{auth}$ 1006 in FIG. 10.

At act 1309, in a case where the network accepts the $T_{auth}$ negotiation information of the terminal 1000, the value of the timer $T_{auth}$ in the terminal 1000 is unchanged. This process is implemented by the timer $T_{auth}$ 1006 in FIG. 10.

At act 1310, after the terminal 1000 receives the authentication pseudo-random code completely, the communication protocol stack 1002 of the VSIM card sends a message to the communication protocol stack switching control unit 1003. In this process, the communication protocol stack 1002 of the VSIM card in FIG. 10 is responsible for sending the message to the communication protocol stack switching control unit 1003.

At act 1311, after the reception of the message, the communication protocol stack switching control unit 1003 quickly switches from the communication protocol stack 1002 of the VSIM card to the communication protocol stack 1001 of the physical SIM card, and simultaneously starts the timer $T_{auth}$. In this process, the communication protocol stack switching control unit 1003 in FIG. 10 implements the switching and the timer $T_{auth}$ 1006 is started. The timer is valued as follows: $T_{auth}$=time interval for retransmitting the authentication pseudo-random code sent by the wireless network in two times*(the number of authentication pseudo-random code retransmission times−1.

At act 1312, when the act 1311 is executed, the communication protocol stack switching control unit 1003 suspends the communication protocol stack 1002 of the VSIM card and switches to the communication protocol stack 1001 of the physical SIM card, but the communication protocol stack 1002 of the VSIM card still keeps a current state and waits for a calculation result of the authentication pseudo-random code.

At act 1313, the timer $T_{auth}$ starts to monitor subsequent acts and procedures involved by the terminal 1000. If the timer does not expire, the subsequent procedures are executed in sequence. Once the timer expires], regardless of which protocol stack works at present, the communication protocol stack switching control unit 1003 switches to the communication protocol stack 1002 of the VSIM card and then return to the act 1305. In this process, the timer $T_{auth}$ 1006 in FIG. 10 is responsible for implementing time control and the communication protocol stack switching control unit 1003 is responsible for implementing a switching process.

At act 1314, in a case where the timer $T_{auth}$ expires, the communication protocol stack switching control unit 1003 switches to the communication protocol stack 1002 of the VSIM card regardless of which protocol stack works at present and then returns to the act 1305. In this process, the timer $T_{auth}$ 1006 in FIG. 10 is responsible for implementing time control and the communication protocol stack switching control unit 1003 is responsible for implementing a switching process of switching to the communication protocol stack 1002 of the VSIM card.

At act 1315, within a time of the timer $T_{auth}$, after the communication protocol stack switching control unit 1003 switches to the communication protocol stack 1001 of the physical SIM card, the communication protocol stack 1001 of the physical SIM card restores the data service with the wireless network and establishes a connection with the service center of the VSIM card. This process is implemented by the communication protocol stack 1001 of the physical SIM card in FIG. 10.

At act 1316, within a time of the timer $T_{auth}$, after establishing the connection with the service center of the VSIM card, the communication protocol stack 1001 of the physical SIM card reads the authentication pseudo-random code from the VSIM card unit 1005 and sends the authentication pseudo-random code to the service center of the VSIM card. In this process, the communication protocol stack 1001 of the physical SIM card in FIG. 10 is responsible for reading the authentication pseudo-random code from the VSIM card unit 1005 and then sending the authentication pseudo-random code to the service center of the VSIM card.

At act 1317, within a time of the timer $T_{auth}$, the terminal 1000 receives a calculation result of the authentication pseudo-random code from the service center of the VSIM card and stores the calculation result in the VSIM card unit 1005. In this process, the VSIM card unit 1005 in FIG. 10 is responsible for storing.

At act 1318, within a time of the timer $T_{auth}$, after the terminal 1000 receives the calculation result, the communication protocol stack 1001 of the physical SIM card sends a message to the communication protocol stack switching control unit 1003 and prompts that the calculation result has been received. In this process, the communication protocol stack 1001 of the physical SIM card in FIG. 10 is responsible for sending the message to the communication protocol stack switching control unit 1003.

At act 1319, within a time of the timer $T_{auth}$, after the reception of the message prompting that the calculation result has been received, the communication protocol stack switching control unit 1003 switches to the communication protocol stack 1002 of the VSIM card. This process is implemented by the communication protocol stack switching control unit 1003 in FIG. 10 which switches to the communication protocol stack 1002 of the VSIM card.

At act 1320, within a time of the timer $T_{auth}$, the communication protocol stack 1002 of the VSIM card reads the calculation result from the VSIM card unit 1005 and sends the calculation result to the wireless network with which the communication state is kept. In this process, the communication protocol stack 1002 of the VSIM card in FIG. 10 reads the information from the VSIM card unit 1005.

At act 1321, the network judges whether the authentication calculation result sent by the terminal 1000 is correct or not.

At act 1322, in a case where the calculation result is incorrect or the network feeds back that the authentication expires, the terminal 1000 receives authentication refusal information or expiration information sent back by the network, and the terminal 1000 judges whether the number of times of receiving this type of information is less than n (the value of n is determined according to an actual condition, n≥2) or not first, and then returns to the act 1305 in a case where the time is less than n. This process is implemented by the communication protocol stack 1002 of the VSIM card in FIG. 10.

At act 1323, in a case where the number of times of reception of the authentication refusal information is greater than or equal to n, the communication protocol stack switching control unit 1003 switches to the communication protocol stack 1001 of the physical SIM card and returns to the act 1324. In this process, the communication protocol stack 1002 of the VSIM card in FIG. 10 sends a message to the communication protocol stack switching control unit 1003.

At act 1324, in a case where the wireless network judges that the authentication calculation result is correct, the entire VSIM card authentication process is completed and the process ends.

Through the above embodiments, the terminal may implement an interactive process between a VSIM card server and the wireless network under a single-chip and single-antenna condition. The entire authentication process of the VSIM card is implemented under the single-chip and single-antenna condition, and the purposes of reducing the design complexity of hardware and simplifying the VSIM card authentication process are achieved.

Through the description of the embodiments, a person skilled in the art may clearly understand that the embodiment methods may be implemented via a manner of software and a necessary universal hardware platform, and of course, may also be via hardware. However, in most cases, the former is an exemplary embodiment. Based on such an understanding, the technical solutions of the embodiments of the present disclosure may be embodied in form of software product, and the computer software product is stored in a storage medium (such as a Read-Only Memory (ROM)/Random Access Memory (RAM), a magnetic disk and an optical disk), including a plurality of instructions arranged to enable a computer (which may be a mobile phone, a computer, a server, a network device or the like) to execute the method in each embodiment of the present disclosure.

It is to be noted that, each module may be implemented by the software or the hardware. For the later, it may be implemented via the following manners but is not limited to this: the above modules all are located in a same processor; or, the above modules are respectively located in multiple processors.

An embodiment of the present disclosure also provides a storage medium. Optionally, in this embodiment, the storage medium may be configured to execute a program code in the following acts.

At S1, a request for registration on a wireless network is initiated according to initialization information of a VSIM card via a first communication connection, and an authentication pseudo-random code sent by the wireless network is obtained, wherein the first communication connection is a connection established with the wireless network by using a communication protocol stack of the VSIM card.

At S2, the authentication pseudo-random code is sent to a service center of the VSIM card via a second communication connection, and a calculation result sent by the service center and corresponding to the authentication pseudo-random code is obtained, wherein the second communication connection is a connection established with the wireless network by using a communication protocol stack of a physical SIM card.

At S3, the calculation result is sent to the wireless network via the first communication connection, wherein the calculation result is used for performing communication verification on the VSIM card.

Optionally, in this embodiment, the storage medium may include but not limited to a medium capable storing the program code such as a U disk, an ROM, an RAM, a mobile hard disk, a magnetic disk or an optical disk.

Optionally, in this embodiment, a processor executes the acts in the method of this embodiment according to a program code stored in the storage medium.

Optionally, specific examples in this embodiment may be referred to examples described in the above embodiments and optional implementation manners, and will not be repeated in this embodiment.

Obviously, those skilled in the art should know that each module or each act of the present disclosure may be implemented by a universal computing device, and the modules or acts may be concentrated on a single computing device or distributed on a network formed by a plurality of computing devices, and may optionally be implemented by program codes executable for the computing devices, so that the modules or acts may be stored in a storage device for execution with the computing devices, the shown or described acts may be executed in sequences different from those described here in some circumstances, or may form each integrated circuit module respectively, or multiple modules or acts therein may form a single integrated circuit module for implementation. Therefore, the present disclosure is not limited to any specific hardware and software combination.

The above is only the exemplary embodiments of the present disclosure and not intended to limit the present disclosure. For those skilled in the art, the present disclosure may have various modifications and variations. Any modifications, equivalent replacements, improvements and the like made within the principle of the present disclosure shall fall within the scope of protection defined by the appended claims of the present disclosure.

INDUSTRIAL APPLICABILITY

The technical solutions in the above embodiments of the present disclosure may be used in an implementation process of the verification method. The request for registration on the wireless network is initiated according to the initialization information of the VSIM card via the first communication connection, and the authentication pseudo-random code sent by the wireless network is obtained, wherein the first communication connection is the connection established with the wireless network by using the communication protocol stack of the VSIM card; the authentication pseudo-random code is sent to the service center of the VSIM card via the second communication connection, and the calculation result sent by the service center and corresponding to the authentication pseudo-random code is obtained, wherein the second communication connection is the connection established with the wireless network by using the communication protocol stack of the physical SIM card; and the calculation result is sent to the wireless network via the first communication connection, wherein the calculation result is used for performing communication verification on the VSIM card. By using the solution, the problem of how to implement a VSIM card technology in a terminal with a single chip and a single antenna is solved, and the use of a VSIM card in a terminal with a single chip and a single antenna is implemented.

What is claimed is:

1. A verification method, comprising:
    initiating a request for registration on a wireless network according to initialization information of a Virtual Subscriber Identity Module (VSIM) card via a first communication connection, and obtaining an authentication pseudo-random code sent by the wireless network, wherein the first communication connection is a connection established with the wireless network by using a communication protocol stack of the VSIM card;
    sending the authentication pseudo-random code to a service center of the VSIM card via a second communication connection, and obtaining a calculation result sent by the service center and corresponding to the authentication pseudo-random code, wherein the second communication connection is a connection established with the wireless network by using a communication protocol stack of a physical Subscriber Identity Module (SIM) card; and
    sending the calculation result to the wireless network via the first communication connection, wherein the calculation result is used for performing communication verification on the VSIM card.

2. The method as claimed in claim 1, before initiating the request for registration on the wireless network according to the initialization information of the VSIM card, comprising:
    obtaining the initialization information of the VSIM card via the second communication connection.

3. The method as claimed in claim 2, further comprising:
    after obtaining the initialization information of the VSIM card via the second communication connection, and before initiating the request for registration on the wireless network according to the initialization information of the VSIM card, suspending the communication protocol stack of the physical SIM card and starting the communication protocol stack of the VSIM card;
    after obtaining the authentication pseudo-random code sent by the wireless network, and before sending the authentication pseudo-random code to the service center of the VSIM card, suspending the communication protocol stack of the VSIM card, and starting the communication protocol stack of the physical SIM card; and
    after obtaining the calculation result sent by the service center and corresponding to the authentication pseudo-random code, suspending the communication protocol stack of the physical SIM card and starting the communication protocol stack of the VSIM card.

4. The method as claimed in claim 3, wherein
    suspending the communication protocol stack of the physical SIM card comprises: terminating a data connection between the physical SIM card and the wireless network while maintaining registration of the communication protocol stack of the physical SIM card on the wireless network; or sending a detachment message to the wireless network, wherein the detachment message is used for terminating a communication link between the physical SIM card and the wireless network; and
    suspending the communication protocol stack of the VSIM card comprises: processing the authentication pseudo-random code after the communication protocol stack of the VSIM card receives the authentication pseudo-random code sent by the wireless network.

5. The method as claimed in claim 4, wherein
    under a condition in which the data connection between the physical SIM card and the wireless network is terminated while registration of the communication protocol stack of the physical SIM card on the wireless network is maintained, starting the communication protocol stack of the physical SIM card comprises: re-initiating a data connection to the wireless network by the physical SIM card;
    under a condition in which the detachment message is sent to the wireless network, wherein the detachment message is used for terminating the communication link between the physical SIM card and the wireless network, starting the communication protocol stack of the physical SIM card comprises: sending an attachment request to the wireless network by using the communication protocol stack of the physical SIM card, wherein the attachment request is used for re-initiating a request for registration of the physical SIM card; and
    under a condition in which the authentication pseudo-random code is processed after the communication protocol stack of the VSIM card receives the authentication pseudo-random code sent by the wireless network, starting the communication protocol stack of the VSIM card comprises: after the calculation result sent by the service center and corresponding to the authentication pseudo-random code is obtained, sending the calculation result to the wireless network by using the communication protocol stack of the VSIM card.

6. The method as claimed in claim 1, further comprising:
    after sending the authentication pseudo-random code to the service center of the VSIM card via the second communication connection, in a case where the calculation result is not obtained within a first predetermined time period, initiating the request for registration on the wireless network again according to the initialization information via the first communication connection.

7. The method as claimed in claim 6, wherein initiating the request for registration on the wireless network according to the initialization information comprises:
    under a condition in which request information of the request for registration on the wireless network comprises negotiation information associated in the first predetermined time period, sending the request information to the wireless network via the second communication connection, wherein
    under a condition in which reply information corresponding to the negotiation information is obtained and the reply information indicates to agree with the negotiation information, in a case where the calculation result is not obtained within the first predetermined time period, the request for registration on the wireless network is initiated again according to the initialization information via the first communication connection; and under a condition in which the reply information indicates to disagree with the negotiation information, in a case where the calculation result is not obtained within a second predetermined time period specified by the reply information, the request for registration on the wireless network is initiated again according to the initialization information via the first communication connection.

8. The method as claimed in claim 1, further comprising:
after sending the calculation result to the wireless network via the first communication connection to perform the communication verification of the VSIM card, under a condition in which the communication verification fails, initiating the request for registration on the wireless network again according to the initialization information via the first communication connection.

9. The method as claimed in claim 2, further comprising:
after sending the calculation result to the wireless network via the first communication connection to perform the communication verification of the VSIM card, making a statistics on the number of times that the communication verification fails; and when the number of times exceeds a preset threshold value, obtaining the initialization information of the VSIM card again via the second communication connection.

10. A verification apparatus, located in a terminal and comprising a hardware processor and a storage medium, the hardware processor being configured to execute the following program modules stored in the storage medium:
a first obtaining module, configured to initiate a request for registration on a wireless network according to initialization information of a Virtual Subscriber Identity Module (VSIM) card via a first communication connection, and obtain an authentication pseudo-random code sent by the wireless network, wherein the first communication connection is a connection established with the wireless network by using a communication protocol stack of the VSIM card;
an authentication module, configured to send the authentication pseudo-random code to a service center of the VSIM card via a second communication connection, and obtain a calculation result sent by the service center and corresponding to the authentication pseudo-random code, wherein the second communication connection is a connection established with the wireless network by using a communication protocol stack of a physical Subscriber Identity Module (SIM) card; and
a sending module, configured to send the calculation result to the wireless network via the first communication connection, wherein the calculation result is used for performing communication verification on the VSIM card.

11. The apparatus as claimed in claim 10, the hardware processor being further configured to execute the following program module stored in the storage medium:
a second obtaining module, configured to obtain the initialization information of the VSIM card via the second communication connection before the request for registration on the wireless network is initiated according to the initialization information of the VSIM card.

12. The apparatus as claimed in claim 11, the hardware processor being further configured to execute the following program module stored in the storage medium: a switching module, wherein
the switching module is configured to suspend the communication protocol stack of the physical SIM card and start the communication protocol stack of the VSIM card after the initialization information of the VSIM card is obtained via the second communication connection and before the request for registration on the wireless network is initiated according to the initialization information of the VSIM card;
the switching module is further configured to suspend the communication protocol stack of the VSIM card, and start the communication protocol stack of the physical SIM card after the authentication pseudo-random code sent by the wireless network is obtained and before the authentication pseudo-random code is sent to the service center of the VSIM card; and
the switching module is further configured to suspend the communication protocol stack of the physical SIM card and start the communication protocol stack of the VSIM card after the calculation result sent by the service center and corresponding to the authentication pseudo-random code is obtained.

13. The apparatus as claimed in claim 10, the hardware processor being further configured to execute the following program module stored in the storage medium:
a timing module, configured to initiate the request for registration on the wireless network again according to the initialization information via the first communication connection in a case where the calculation result is not obtained within a first predetermined time period after the authentication pseudo-random code is sent to the service center of the VSIM card via the second communication connection.

14. The apparatus as claimed in claim 13, the hardware processor being further configured to execute the following program module stored in the storage medium:
a negotiation module, configured to send request information to the wireless network via the second communication connection under a condition in which the request information of the request for registration on the wireless network comprises negotiation information associated in the first predetermined time period, wherein
under a condition in which reply information corresponding to the negotiation information is obtained and the reply information indicates to agree with the negotiation information, in a case where the calculation result is not obtained within the first predetermined time period, the request for registration on the wireless network is initiated again according to the initialization information via the first communication connection; and under a condition in which the reply information indicates to disagree with the negotiation information, in a case where the calculation result is not obtained within a second predetermined time period specified by the reply information, the request for registration on the wireless network is initiated again according to the initialization information via the first communication connection.

15. The apparatus as claimed in claim 10, the hardware processor being further configured to execute the following program module stored in the storage medium:
a verification module, configured to initiate the request for registration on the wireless network again according to the initialization information via the first communication connection under a condition in which the communication verification fails after the calculation result is sent to the wireless network via the first communication connection to perform the communication verification of the VSIM card.

16. The apparatus as claimed in claim 11, the hardware processor being further configured to execute the following program module stored in the storage medium:
a statistic module, configured to make a statistics on the number of times that the communication verification fails after the calculation result is sent to the wireless network via the first communication connection to perform the communication verification of the VSIM card, and obtain the initialization information of the VSIM card again via the second communication connection when the number of times exceeds a preset threshold value.

17. A terminal, comprising a verification apparatus, wherein the verification apparatus comprises a hardware processor and a storage medium, the hardware processor being configured to execute the following program modules stored in the storage medium:
- a first obtaining module, configured to initiate a request for registration on a wireless network according to initialization information of a Virtual Subscriber Identity Module (VSIM) card via a first communication connection, and obtain an authentication pseudo-random code sent by the wireless network, wherein the first communication connection is a connection established with the wireless network by using a communication protocol stack of the VSIM card;
- an authentication module, configured to send the authentication pseudo-random code to a service center of the VSIM card via a second communication connection, and obtain a calculation result sent by the service center and corresponding to the authentication pseudo-random code, wherein the second communication connection is a connection established with the wireless network by using a communication protocol stack of a physical Subscriber Identity Module (SIM) card; and
- a sending module, configured to send the calculation result to the wireless network via the first communication connection, wherein the calculation result is used for performing communication verification on the VSIM card.

18. A non-transitory computer storage medium, configured to store an execution instruction which is used for implementing the verification method as claimed in claim 1.

19. The apparatus as claimed in claim 12, wherein the switching module is configured to:
- suspend the communication protocol stack of the physical SIM card in a following manner: terminating a data connection between the physical SIM card and the wireless network while maintaining registration of the communication protocol stack of the physical SIM card on the wireless network; or sending a detachment message to the wireless network, wherein the detachment message is used for terminating a communication link between the physical SIM card and the wireless network; and
- suspend the communication protocol stack of the VSIM card in a following manner: processing the authentication pseudo-random code after the communication protocol stack of the VSIM card receives the authentication pseudo-random code sent by the wireless network.

20. The apparatus as claimed in claim 19, wherein the switching module is configured to start the communication protocol stack of the physical SIM card in a following manner:
- under a condition in which the data connection between the physical SIM card and the wireless network is terminated while registration of the communication protocol stack of the physical SIM card on the wireless network is maintained, re-initiating a data connection to the wireless network by the physical SIM card;
- under a condition in which the detachment message is sent to the wireless network, wherein the detachment message is used for terminating the communication link between the physical SIM card and the wireless network, sending an attachment request to the wireless network by using the communication protocol stack of the physical SIM card, wherein the attachment request is used for re-initiating a request for registration of the physical SIM card; and
- wherein the switching module is configured to start the communication protocol stack of the VSIM card in a following manner:
- under a condition in which the authentication pseudo-random code is processed after the communication protocol stack of the VSIM card receives the authentication pseudo-random code sent by the wireless network, after the calculation result sent by the service center and corresponding to the authentication pseudo-random code is obtained, sending the calculation result to the wireless network by using the communication protocol stack of the VSIM card.

* * * * *